United States Patent
Kauhaniemi et al.

(10) Patent No.: US 9,823,093 B2
(45) Date of Patent: Nov. 21, 2017

(54) FOLDING ANGLE SENSING OF A FOLDABLE DEVICE

(71) Applicant: Microsoft Technology Licensing, LLC, Redmond, WA (US)

(72) Inventors: Ilpo Kauhaniemi, Vantaa (FI); Miika Rummukainen, Lieto (FI); Esa Määttä, Espoo (FI); Mikael Kontkanen, Ilmarinen (FI)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/935,305

(22) Filed: Nov. 6, 2015

(65) Prior Publication Data

US 2017/0131118 A1 May 11, 2017

(51) Int. Cl.
*G01D 5/14* (2006.01)
(52) U.S. Cl.
CPC .................................... *G01D 5/145* (2013.01)
(58) Field of Classification Search
CPC ............................... G01D 5/142; G01D 5/145
USPC ......................................... 324/207.2, 207.26
See application file for complete search history.

(56) References Cited

U.S. PATENT DOCUMENTS

| 4,302,138 | A | * | 11/1981 | Zarudiansky | .............. | B25J 3/04 |
| | | | | | | 414/5 |
| 6,050,962 | A | * | 4/2000 | Kramer | ................ | A61B 5/1071 |
| | | | | | | 600/595 |
| 6,060,969 | A | * | 5/2000 | Hufgard | | |
| 6,104,379 | A | * | 8/2000 | Petrich | ..................... | G06F 3/011 |
| | | | | | | 345/156 |
| 6,110,130 | A | * | 8/2000 | Kramer | ................ | A61B 5/1071 |
| | | | | | | 600/587 |

(Continued)

FOREIGN PATENT DOCUMENTS

WO    2013191068 A1    12/2013

OTHER PUBLICATIONS

Kamal, "Recent Nokia Patent Reveals a Foldable Device with Bendable Display", Published on: Jun. 5, 2015 Available at: http://www.nokiapoweruser.com/recent-nokia-patent-reveals-a-foldable-device-with-bendable-display/.

(Continued)

*Primary Examiner* — Walter L Lindsay, Jr.
*Assistant Examiner* — Milton Gonzalez
(74) *Attorney, Agent, or Firm* — Alleman Hall Creasman & Tuttle LLP

(57) ABSTRACT

A device is disclosed comprising: a first portion; a second portion; a hinge element between the first portion and the second portion; a magnetic sensor disposed on the first portion configured to measure an ambient magnetic field; a non-extensible element configured between the first portion and the second portion, and fixed with respect to the second portion; a magnetic element configured on a free end of the non-extensible element so that a rotation of the first portion with respect to the second portion causes relative motion between the magnetic element and the magnetic sensor, thereby causing a change in a magnetic field between the magnetic element and the magnetic sensor; wherein an angle of fold between the two portions is calculated based on the change in the magnetic field as determined by the magnetic sensor.

18 Claims, 5 Drawing Sheets

(56) References Cited

U.S. PATENT DOCUMENTS

| | | | |
|---|---|---|---|
| 6,373,006 B1 * | 4/2002 | Toki | H01H 3/162 |
| | | | 200/1 B |
| 8,713,759 B2 | 5/2014 | Cai | |
| 8,943,649 B2 | 2/2015 | Chen et al. | |
| 8,988,876 B2 | 3/2015 | Corbin et al. | |
| 2010/0298032 A1 | 11/2010 | Lee et al. | |
| 2013/0205142 A1 | 8/2013 | Jung | |
| 2013/0249873 A1 | 9/2013 | Zhang et al. | |
| 2014/0196254 A1 | 7/2014 | Song | |
| 2014/0211380 A1 | 7/2014 | Tsai | |
| 2014/0298062 A1 * | 10/2014 | Lee | |
| 2014/0375219 A1 | 12/2014 | Lee et al. | |
| 2015/0009614 A1 | 1/2015 | Tsai | |
| 2015/0049426 A1 | 2/2015 | Smith et al. | |
| 2015/0131222 A1 | 5/2015 | Kauhaniemi et al. | |
| 2015/0146349 A1 | 5/2015 | Choi et al. | |
| 2015/0177789 A1 | 6/2015 | Jinbo | |
| 2015/0185782 A1 | 7/2015 | Kim et al. | |

OTHER PUBLICATIONS

Hachman, Mark, "Microsoft Surface Pro 3 review: A legitimate work PC in tablet clothing", Published on: May 27, 2014 Available at: http://www.pcworld.com/article/2158171/microsoft-surface-pro-3-review-a-legitimate-work-pc-in-tablet-clothing.html.

Rehman, "Zayed", "Logitech AnyAngle Case For iPad Air 2, iPad mini Announced, Here Are The Details [Video]", Published on: Nov. 20, 2014 Available at: http://www.redmondpie.com/logitech-anyangle-case-for-ipad-air-2-ipad-mini-announced-here-are-the-details-video/.

ISA European Patent Office, International Search Report and Written Opinion Issued in PCT Application No. PCT/US2016/060205, dated Apr. 13, 2017, WIPO, 14 Pages.

\* cited by examiner

FOLDING ANGLE SENSING OF A FOLDABLE DEVICE

BACKGROUND

Use of portable digital devices is becoming more and more prevalent. For example, over a third of the world population is projected to own a smartphone by 2017. In addition to smartphones, portable devices like music players, tablet computers and other lightweight computing and entertainment devices are becoming popular too. To differentiate from competitors, manufacturers of such devices may introduce different form factors. Foldable electronic devices may be one such form factor.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

A foldable device is described. In an embodiment, a device is disclosed comprising: a first portion; a second portion; a hinge element between the first portion and the second portion; a magnetic sensor disposed on the first portion configured to measure an ambient magnetic field; a non-extensible element configured between the first portion and the second portion, and fixed with respect to the second portion; a magnetic element configured on a free end of the non-extensible element so that a rotation of the first portion with respect to the second portion causes relative motion between the magnetic element and the magnetic sensor, thereby causing a change in a magnetic field between the magnetic element and the magnetic sensor; wherein an angle of fold between the two portions is calculated based on the change in the magnetic field as determined by the magnetic sensor.

In other embodiments, a mobile device and a method are discussed.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like references are used to designate like parts in the accompanying drawings.

DETAILED DESCRIPTION

The detailed description provided below in connection with the appended drawings is intended as a description of the embodiments and is not intended to represent the only forms in which the embodiment may be constructed or utilized. However, the same or equivalent functions and structures may be accomplished by different embodiments.

Although the embodiments may be described and illustrated herein as being implemented in a smartphone, this is only an example implementation and not a limitation. As those skilled in the art will appreciate, the present embodiments are suitable for application in a variety of different types of foldable computing devices, for example tablet computers, music players etc., wherein an angle of fold is to be determined between at least two portions of the device.

The term 'computer', 'computing device', 'apparatus' or 'mobile apparatus' is used herein to refer to any device with processing capability such that it can execute instructions. Those skilled in the art will realize that such processing capabilities are incorporated into many different devices and therefore the terms 'computer' and 'computing device' each include PCs, servers, laptop computers, mobile telephones (including smart phones), tablet computers, media players, games consoles, personal digital assistants and many other devices.

Figure 1:
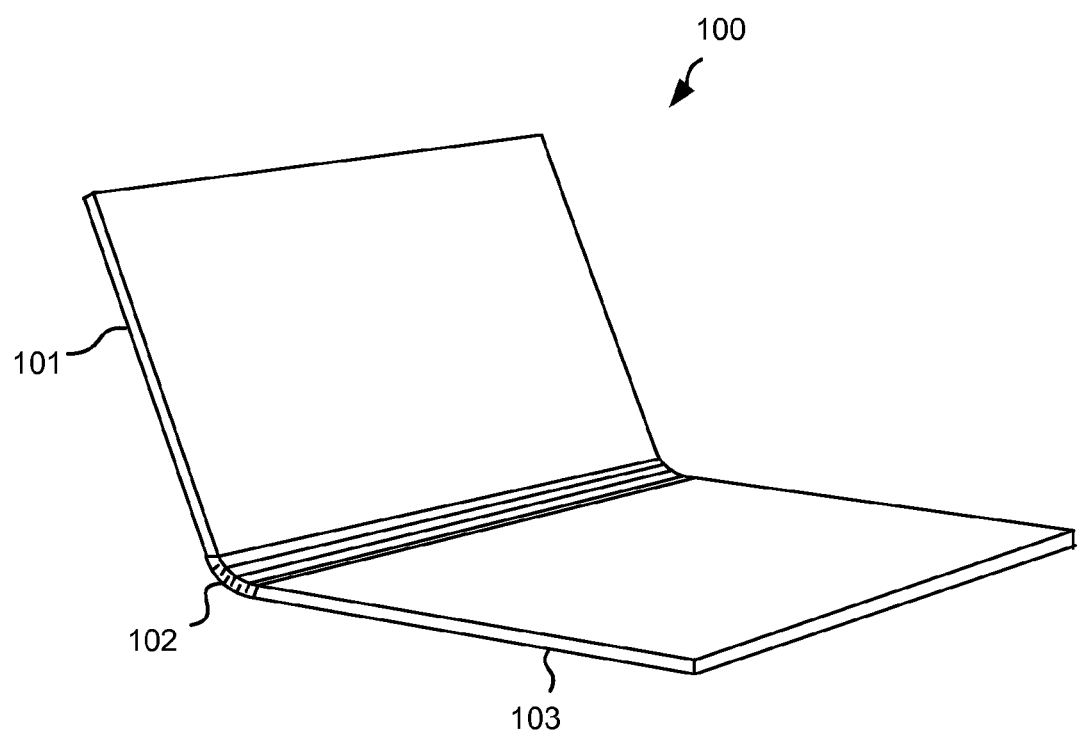
FIG. 1 illustrates a schematic representation of a device comprising two portions according to an embodiment.

FIG. 1 illustrates a foldable device 100 according to an embodiment. It comprises two portions 101 and 103 joined together by a hinge element 102. According to an embodiment, the hinge element 102 may be a foldable element. The device 100 further comprises a non-extensible element (not shown in FIG. 1), with a permanent magnet disposed on one of its ends and at least one sensor. The non-extensible element may be configured between the two portions 101 and 103. The non-extensible element may be a wire, a metal wire, a flexible or bendable rod, a chain, etc. A length of the non-extensible material is predetermined, standard and/or fixed. The hinge portion may allow various degrees of freedom of rotation between the portions 101 and 103. According to an embodiment, the hinge element 102 may provide freedom of rotation from 0 degrees to 180 degrees between the portion 103 and 101, allowing the device to go from a completely folded position to a flat position. According to another embodiment, the hinge may provide freedom of rotation between 0 to 360 degrees, allowing folding of device in any direction. According to another embodiment, the hinge element 102 may provide freedom of rotation in any range selected from 0 to 360 degrees. According to an embodiment the hinge element 102 may extend end to end between the edges of portions 101 and 103. According to another embodiment, the hinge element 102 may join the edges of portions 101 and 103 at only certain points. Hinge element may include any structural element which allows portions 101 and 103 to fold and/or rotate with respect to each other. This folding and/or rotation may be along or substantially along the edges of portions 101 and 103 which are joined via the hinge.

Figure 2:
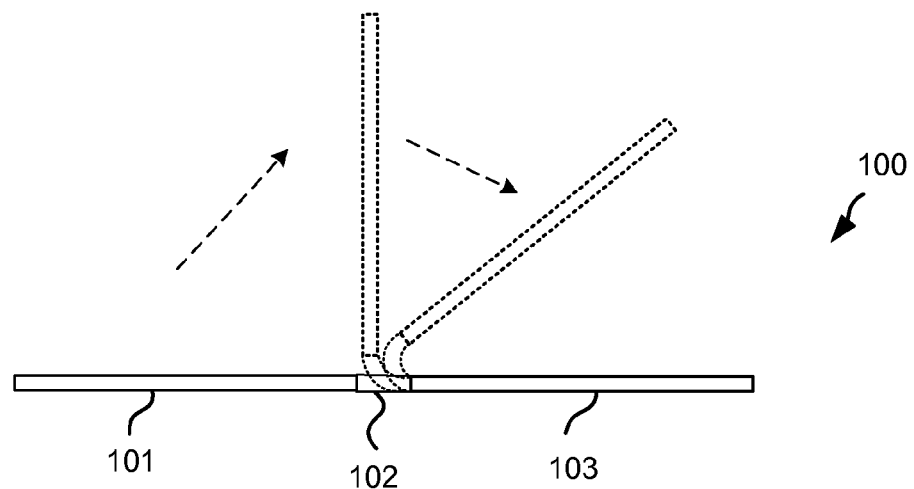
FIG. 2 illustrates a schematic side view representation of a device in various folding positions according to an embodiment.

FIG. 2 illustrates some example folding angles of device 100. The device 100 may be in a flat configuration such that the angle between the two portions 101 and 103 is 180 degrees or substantially 180 degrees. One of the portions, for example portion 101, may be rotated with respect to the other portion 103 at the hinge portion by various angles. The hinge element 102 may comprise one or more hinges (not illustrated in FIG. 2) which enable rotation, folding or pivoting motion. According to an embodiment a hinge may be comprise a pin and a sleeve, among other components. According to an embodiment, a hinge element 102 may comprise multi-stage hinges, so that rotation occurs along multiple closely spaced parallel axes. According to an embodiment, a hinge element 102 may be such that it maintains portions 101 and 103 at an angle of rotation or folding set by a user. According to an embodiment, hinge element may employ friction to maintain portions 101 and 103 at an angle set by the user.

Figure 3:
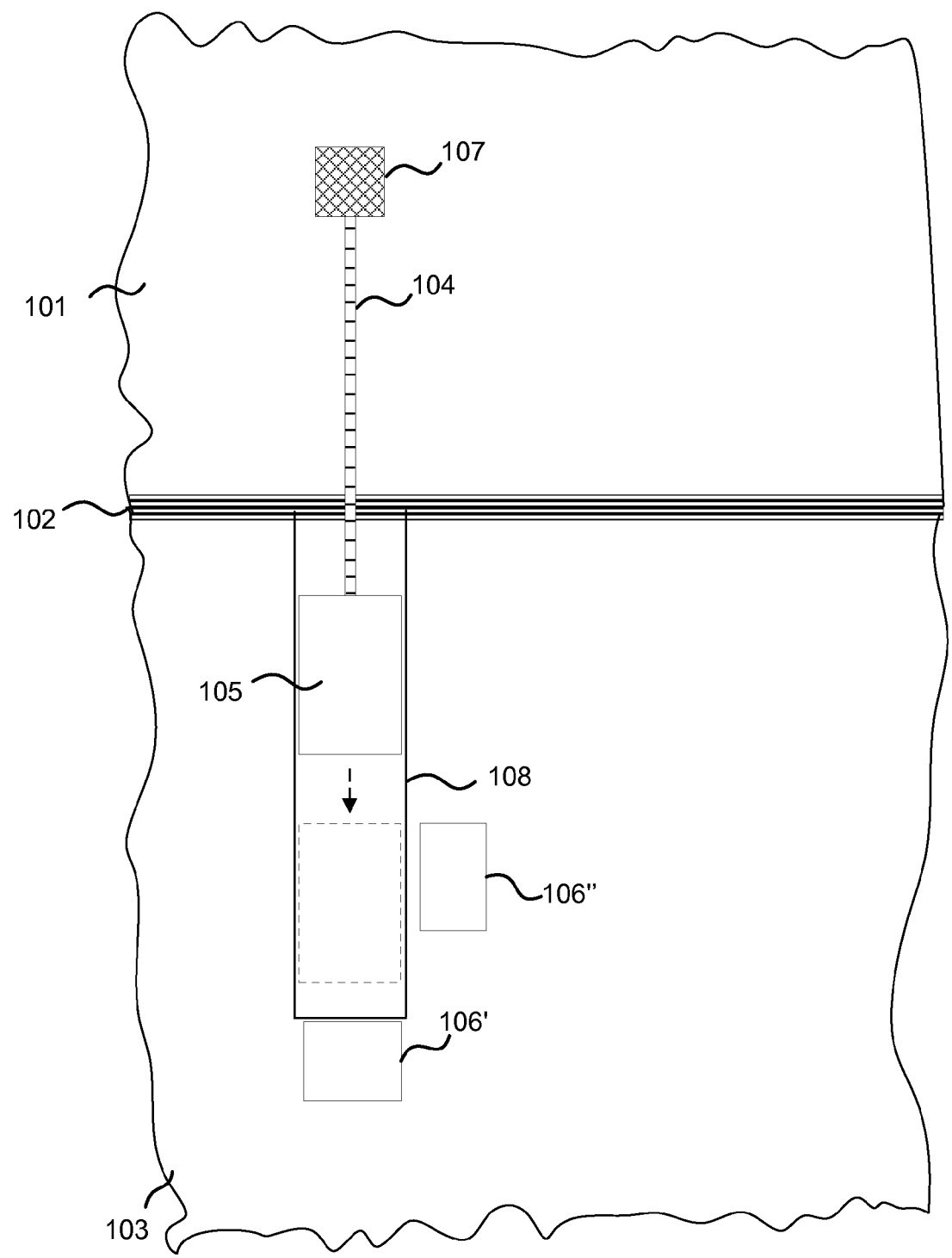
FIG. 3 illustrates a schematic top view representation of a device in an unfolded position according to an embodiment.

FIG. 3 illustrates a sectional view of a portion of device 100 according to an embodiment. The device 100 comprises of two portions 101 and 103, joined foldably to each other by a hinge element 102. A chain element 104 may be configured between the portions 101 and 103. According to an embodiment, the chain element 104 is configured as the non-extensible element as described in the embodiments of FIGS. 1 and 2. The chain element 104 may be fixed on one side to prevent any motion on that side while the other end may be configured so as to allow longitudinal motion. According to an embodiment, the end of chain element 104 which is on the side of portion 101 may be fixed by means of a fixture 107. The fixture 107 may be any element able to suitably prevent any longitudinal motion of the chain element 104. Fixture 107 may be adhesion based, mechanical, electro-mechanical or any combination of these. At the free end of the chain element 104, a suitably sized permanent magnet 105 may be disposed. The permanent magnet 105 may be disposed such that when the chain element 104 applies a pulling or pushing force on it, it moves longitudinally along a guided track 108. The guided track 108 may be any structure restricting motion of the magnet 105 along a guide line. According to an embodiment, such tracks may include tunnels or channels in the material surrounding the magnet 105. According to another embodiment, the magnet 105 may comprise grooves or raised lines on a surface with corresponding raised lines or grooves in at least one surface inside or on portion 103. Magnetic sensors 106' may be disposed at the longitudinal end. Magnetic sensor 106" may be disposed at a lateral side of the guided track 108. Although FIG. 3 illustrates magnetic sensors 106 simultaneously, according to an embodiment there is either one of them at the time. According to embodiment, the magnetic sensor 106' is disposed at the longitudinal end (and no sensor disposed at the lateral side). According to another embodiment, the magnetic sensor 106" is disposed at the lateral side of the guided track 108 (and no sensor disposed at the longitudinal end). It should be noted that the guided track 108 and the motion of the magnet 105 does not need to be only in a certain direction. According to an embodiment, the guided track 108 may be implemented in various different directions of x, y and z axis inside the portions 101, 103 and the hinge element 102. For example, the guided track 108 may be transversal, instead of perpendicular, with respect to an axis of rotation of folding the device 100. Furthermore, according to an embodiment the guided track 108 may be a curved, or partially curved and partially longitudinal, and it does not need to be completely longitudinal. The diameter of the tunnel of the guided track 108 must be substantially the same as the diameter of the end of the non-extensible element, such as the end of the chain element 104 or the diameter of the magnet 105, so that the movement of the end correspondences with the axis of rotation caused by folding the device 100.

Referring to illustrations in FIG. 3, The chain element 104 and the magnet 105 disposed on its free end may be configured such that when the device 100 is folded, that is when there is relative rotation between portions 101 and 103, the free end of the chain element 104 and hence the magnet 105 move a corresponding distance longitudinally as guided by the guided track 108. According to an embodiment, the chain element 104, magnet 105 and the guided track 108 may be configured so that when the device is flat, that is, angle between portion 103 and portion 101 is 180 degrees, the magnet 105 is at one end of the channel and when the device 100 is folded completely, that is, when the angle between portions 103 and 101 is 0 degrees, the magnet 105 is at another end of the guided track 108. The magnetic sensor 106 may be disposed so that it is able to discern and determine the varying magnetic field as the magnet 105 moves longitudinally across the range of movement provided by guided track 108. The position of the magnet 105 may be calculated from this magnetic field as determined by the magnetic sensor 106. Based on the position of the magnet 105, the angle of folding between the two portions 101 and 103 of the device 100 may be calculated.

According to an embodiment, the sensor 106 may be a magnetic linear position sensor. According to another embodiment, the sensor 106 may be any Hall Effect sensor capable of determining change in magnetic field. According to an embodiment, a chain element 104 may be replaced by any non-extensible, non-compressible, but flexible length of material so that when configured to be fixed onto one portion 101 of device 100 and have a magnet 105 disposed at its free end, it translates relative angular movement between the two portions 101, 103 of the device 100 into longitudinal movement of a magnet of 105. According to an embodiment, the chain element 104 may also provide frictional resistance to rotation between portions 101 and 103, to help maintain, at least in part, an angle of fold between portions 101 and 103.

Figure 4:
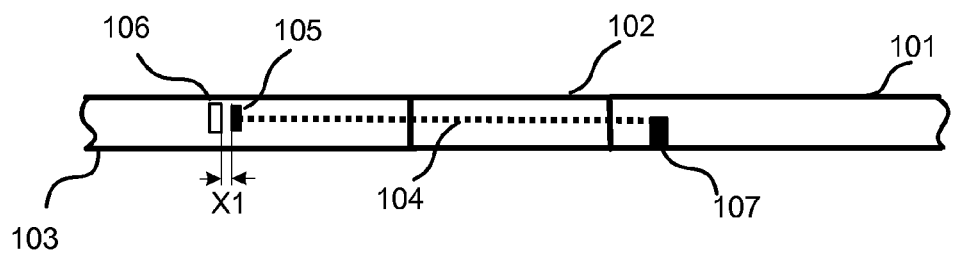
FIG. 4, FIG. 5 and FIG. 6 illustrate a sectional side of the device in various positions according to an embodiment.
Figure 5:
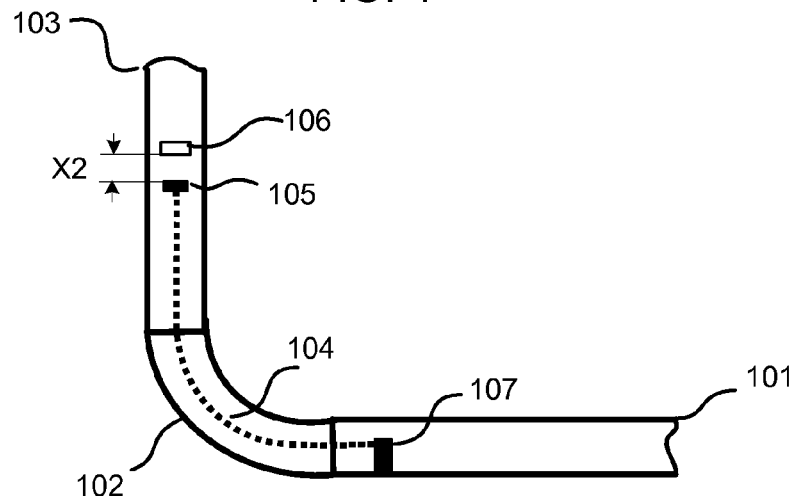
Figure 6:
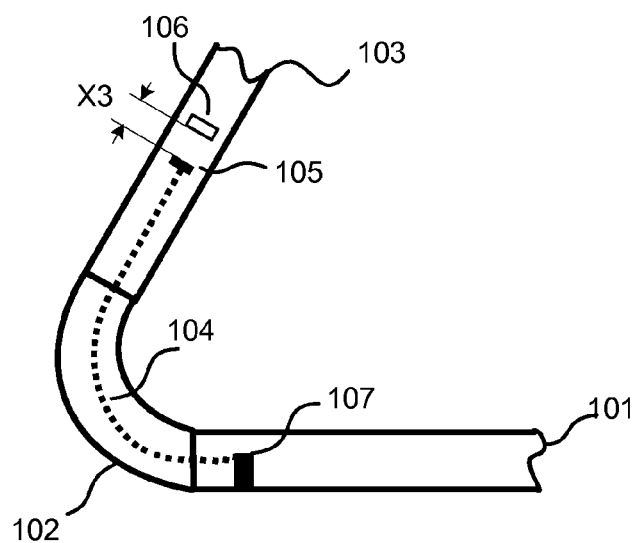

FIG. 4, FIG. 5 and FIG. 6 illustrate a sectional side view of a device 100 folded to various degrees according to an embodiment. Referring to FIG. 4, FIG. 5, and FIG. 6, the device 100 comprises two portions 101 and 103 joined to each other by a hinge element 102. A chain element 104 is configured between the portions 101 and 103 such that it is fixed by a fixture 107 within the portion 101 but free to move longitudinally in portion 103. A magnet 105 is configured on the free end of the chain element 104. A magnetic sensor 106 is configured in the portion 103 along the axis of motion of magnet 105. According to an embodiment, magnetic sensor 106 may be configured parallel to the axis of motion of magnet 105 (not shown in FIGS. 4, 5, 6).

Referring to FIG. 4, the device 100 is flat with the angle between portion 101 and 103 equal or substantially equal to 180 degrees. The distance between the magnet 105 and the magnet sensor 106 is X1. A measure of this distance may be determined by the magnetic sensor 106 by measuring the magnetic field. Referring to FIG. 5, the device is folded substantially at a ninety degree angle. The chain element 104 being non-extensible and non-compressible may bend/flex so that the magnet 105 is moved away from the sensor 106. Consequently, the magnetic field measured by magnetic sensor 106 may change as well. This may be a measure of the distance X2 between the magnet 105 and magnetic sensor 106. Referring to FIG. 6, the device is folded further so that the distance between the magnet 105 and magnetic sensor 106 becomes X3. X3 may be determined from the measured magnetic field by sensor 106.

The distances X1, X2 and X3 are different from each other and may be determined from the magnetic field as measured using the magnetic sensor 106. After calibration, these distances may be translated to corresponding angles between the portions 103 and 101. Calibration may be done during assembly of the device or during operation of the device. According to an embodiment, the calibration is done during assembly; the magnetic field measured by magnetic sensor 106 when the device 100 is flat may be mapped to an angle of zero degrees and the magnetic field measured by sensor 106 when the device 100 is folded to the maximum may be mapped to minimum possible angle of fold. According to an embodiment the minimum possible angle of fold of the device 100 may be zero degrees. According to an embodiment, the device 100 may be folded to angle of fold of 180 degrees, and further to angle of fold of 360 degrees position. According to another embodiment, calibration may be done during operation. A user of the device 100 may be asked by the device, via a user interface, to fold the device to different degrees and corresponding magnetic fields may be measured by the magnetic sensor 106. These fields may be mapped to the angles of folding specified by the device 100 to the user.

According to an embodiment, the device 100 may comprise a touch or a gesture sensitive display covering portions 101 and 103 and the hinge element 102. According to another embodiment, the portions 101 and 103 may comprise two separate touch or gesture sensitive displays. According to an embodiment, a touch or gesture sensitive display may comprise one or more touch sensitive display panels. According to an embodiment, device 100 may comprise at least one input device. Such input devices may include keyboards, touchpads, trackpads, tracker balls, cameras, a microphones etc.

According to an embodiment, the user interface of device 100 may change based on the determined angle of fold. According to another embodiment, change in user interface may include change in display parameters as well. According to an embodiment, the change in user interface may include change in graphical components of the user interface. According to another embodiment the change in user interface may include a change in operational mode of the device 100.

Figure 7:
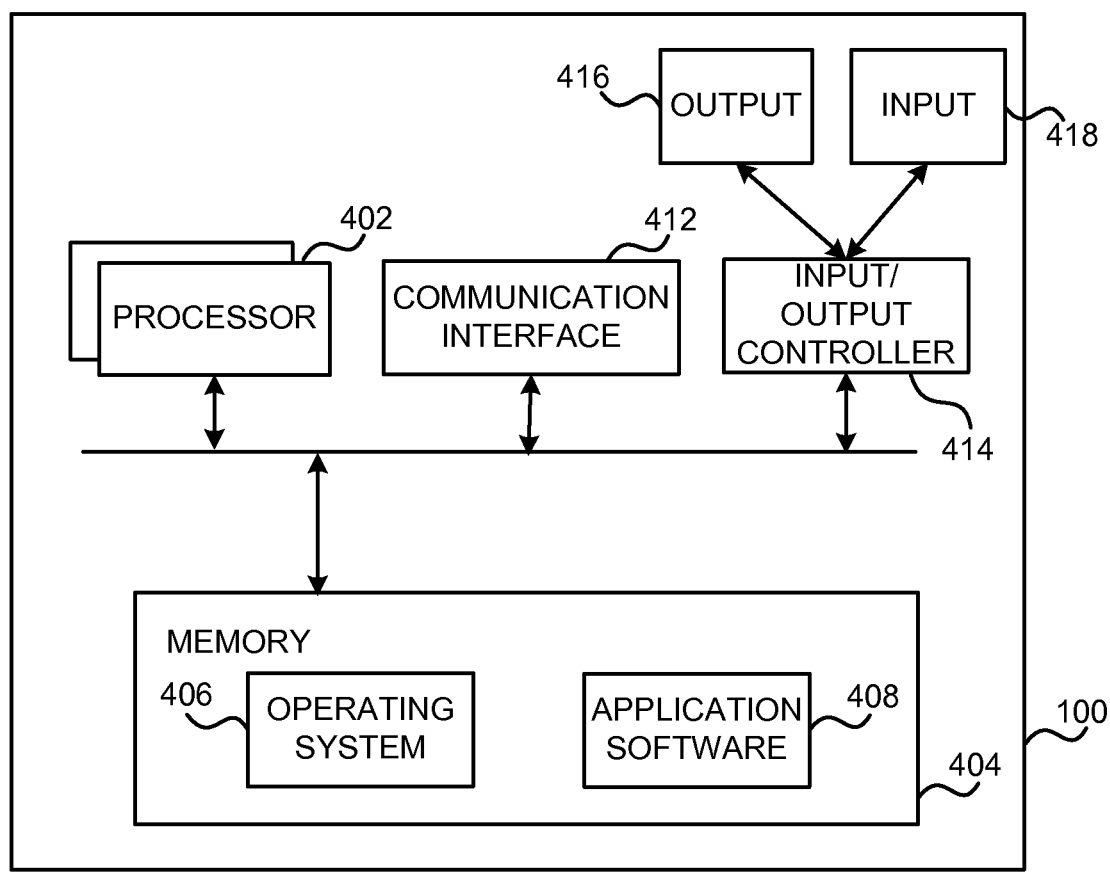
FIG. 7 illustrates a device according to an embodiment as a functional block diagram.

FIG. 7 illustrates an embodiment of components of a device 100 which may be implemented as a form of a computing and/or electronic device. The computing device 100 comprises one or more processors 402 which may be microprocessors, controllers or any other suitable type of processors for processing computer executable instructions to control the operation of the device 100. Platform software comprising an operating system 406 or any other suitable platform software may be provided on the device to enable application software 408 to be executed on the device. According to an embodiment, the calculation of angle of fold of device 100 may be accomplished by software. Furthermore it may receive information from the magnetic sensor 106 regarding the distance X. Consequently, it may convert this information into the angle of fold.

Computer executable instructions may be provided using any computer-readable media that are accessible by the device 100. Computer-readable media may include, for example, computer storage media such as a memory 404 and communications media. Computer storage media, such as a memory 404, include volatile and non-volatile, removable and non-removable media implemented in any method or technology for storage of information such as computer readable instructions, data structures, program modules or other data. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media do not include communication media. Therefore, a computer storage medium should not be interpreted to be a propagating signal per se. Propagated signals may be present in computer storage media, but propagated signals per se are not examples of computer storage media. Although the computer storage medium (the memory 404) is shown within the device 100, it will be appreciated by a person skilled in the art, that the storage may be distributed or located remotely and accessed via a network or other communication link (e.g. using a communication interface 412).

The device 100 may comprise an input/output controller 414 arranged to output information to one or more output device 416, for example a display screen or a speaker, which may be separate from or integral to the device 100. The input/output controller 414 may also be arranged to receive and process an input from one or more input devices 418, for example, a keyboard or a microphone or a touchpad. In one embodiment, the output device 416 may also act as the input device. An example of such a device may be touch sensitive display. The input/output controller 414 may also output data to devices other than the output device, e.g. a locally connected printing device.

The functionality described herein can be performed, at least in part, by one or more hardware logic components. According to an embodiment, the computing device 100 is configured by the program code 406,408 when executed by the processor 402 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Figure 8:
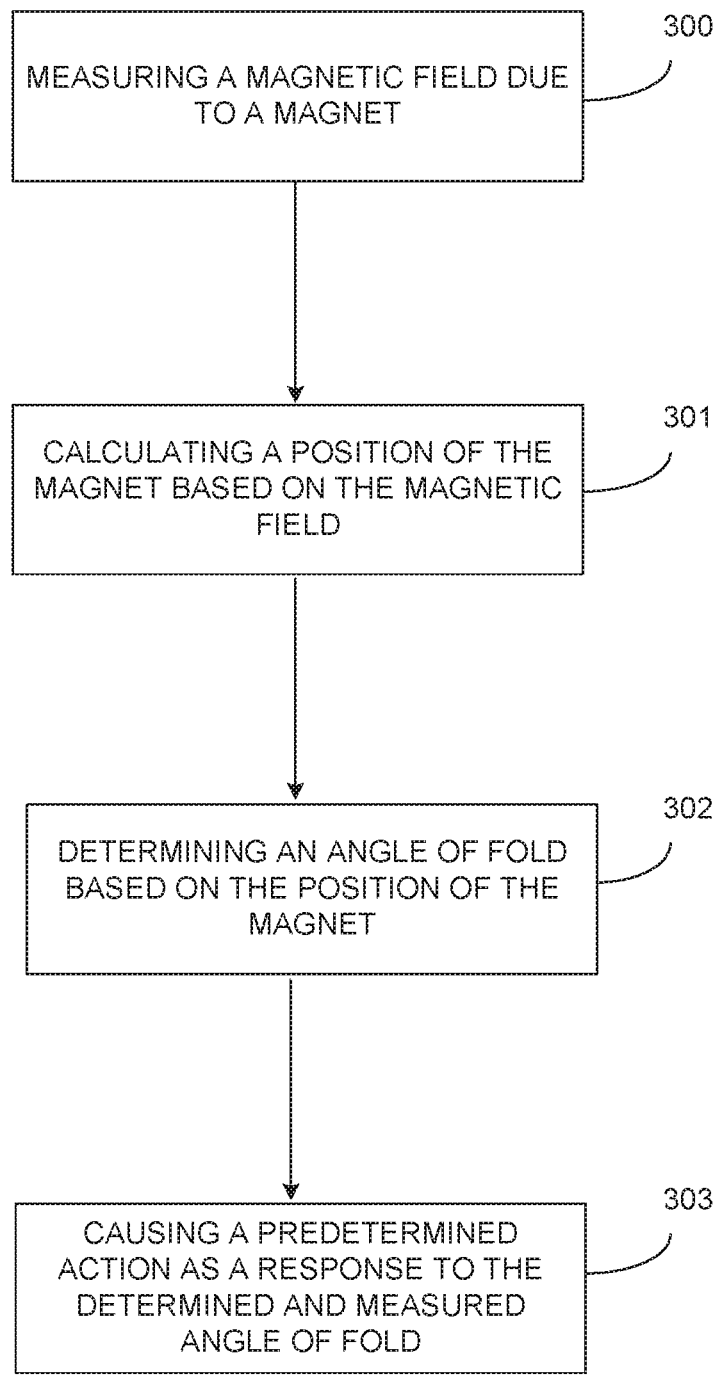
FIG. 8 illustrates a schematic flow chart of a method of measuring a folding angle of a foldable device in accordance with an embodiment.

FIG. 8 illustrates, as a schematic flow chart, a method of calculating an angle of fold of a foldable device in accordance with an embodiment. Referring to FIG. 8, according to an embodiment the process comprises Steps 300, 301 and 302. According to an embodiment, the process of FIG. 8 may be compiled into the program code 406,408.

Step 300 may include measuring a magnetic field due to a magnet. The magnet being configured on a free end of non-extensible, non-compressible flexible element. The non-extensible, non-compressible flexible element may be fixed on one side and free on another side to allow longitudinal motion of the magnet which corresponds to relative rotation between, that is folding of, the two portions of the device.

Step 301 may include calculating a position of the magnet based on the magnetic field measured in Step 300.

Step 302 may include determining an angle of fold of the two portions based on a position of the magnet as measured in Step 301. Furthermore, the method may include step 303 of causing a predetermined action as a response to the determined and measured angle of fold.

The methods and functionalities described herein may be performed by software in machine readable form on a tangible storage medium e.g. in the form of a computer program comprising computer program code means adapted to perform some or all the functions and the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store, parts or all of, an example of the process described as software. A local or terminal computer may access the remote computer and download a part or all of the software to run the program. Alternatively, the local computer may download pieces of the software as needed, or execute some software instructions at the local terminal and some at the remote computer (or computer network). Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

According to an embodiment, a device comprises: a first portion; a second portion; a hinge element between the first portion and the second portion; a magnetic sensor disposed on the first portion configured to measure an ambient magnetic field; a non-extensible element configured between the first portion and the second portion, and fixed with respect to the second portion; a magnetic element configured on a free end of the non-extensible element so that a rotation of the first portion with respect to the second portion causes relative motion between the magnetic element and the magnetic sensor, thereby causing a change in a magnetic field between the magnetic element and the magnetic sensor; wherein an angle of fold between the two portions is calculated based on the change in the magnetic field as determined by the magnetic sensor.

Alternatively or in addition to the above, the non-extensible element comprises a friction element.

Alternatively or in addition to the above, the friction element is disposed so as to maintain the angle of fold between the first portion and the second portion as set by a user of the device.

Alternatively or in addition to the above, the friction element comprises a chain element.

Alternatively or in addition to the above, the non-extensible element is configured inside the hinge element.

Alternatively or in addition to the above, the non-extensible element comprises a wire element.

Alternatively or in addition to the above, the wire comprises a tension wire.

Alternatively or in addition to the above, the magnetic sensor comprises a Hall Effect Sensor.

Alternatively or in addition to the above, the magnetic sensor is disposed along a longitudinal axis of motion of the magnetic element.

Alternatively or in addition to the above, the magnetic sensor is disposed parallel to a longitudinal axis of motion of the magnetic element.

Alternatively or in addition to the above, further comprising a display, wherein the display presents a user interface.

Alternatively or in addition to the above, at least one characteristic of the user interface presented on the display is transformed based on the change in the angle between the first portion and the second portion of the device.

Alternatively or in addition to the above, further comprising an angle measurement unit which calculates the angle of fold between the two portions of the device.

Alternatively or in addition to the above, the angle measurement unit is collocated with the magnetic sensor.

Alternatively or in addition to the above, the angle measurement unit is implemented in a processor comprised in the device.

According to an embodiment, a mobile device comprises: a first portion; a second portion; a folding element between the first portion and the second portion; a magnetic sensor disposed on the first portion capable of measuring an ambient magnetic field; a bendable elongated element having a fixed length, the element configured between the first portion and the second portion, fixed with respect to the second portion; a magnetic element configured on a free end of the element so that rotation of the first portion with respect to the second portion causes relative motion between the magnetic element and the magnetic sensor; wherein an angle of rotation between the two portions is calculated based on the ambient magnetic field as determined by the magnetic sensor.

Alternatively or in addition to the above, further comprising a touch sensitive display providing a graphical user interface.

Alternatively or in addition to the above, at least one characteristic of the graphical user interface is transformed based upon the angle of fold between the portions of the device.

According to an embodiment, a method comprises: measuring a magnetic field due to a magnet, wherein the magnet is configured to move longitudinally corresponding to a folding motion of two portions of a foldable device; calculating a position of the magnet based on the magnetic field;

determining an angle of fold between the two portions of the device, based on the position of the magnet.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device comprising:
   a first portion;
   a second portion;
   a hinge element between the first portion and the second portion;
   a magnetic sensor disposed on the first portion configured to measure a magnetic field;
   a non-extensible element configured between the first portion and the second portion, and fixed with respect to the second portion, wherein the non-extensible element is configured inside the hinge element; and
   a magnetic element configured on a free end of the non-extensible element so that a rotation of the first portion with respect to the second portion causes relative motion between the magnetic element and the magnetic sensor, thereby causing a change in the magnetic field;
   wherein an angle of fold between the two portions is calculated based on the change in the magnetic field as determined by the magnetic sensor.

2. The device of claim 1, wherein the non-extensible element comprises a friction element.

3. The device of claim 2, wherein the friction element is disposed so as to maintain the angle of fold between the first portion and the second portion as set by a user of the device.

4. The device of claim 2, wherein the friction element comprises a chain element.

5. The device of claim 1, wherein the non-extensible element comprises a wire element.

6. The device of claim 5, wherein the wire element comprises a tension wire.

7. The device of claim 1, wherein the magnetic sensor comprises a Hall Effect Sensor.

8. The device of claim 1, wherein the magnetic sensor is disposed along a longitudinal axis of motion of the magnetic element.

9. The device of claim 1, wherein the magnetic sensor is disposed parallel to a longitudinal axis of motion of the magnetic element.

10. The device of claim 1, further comprising a display, wherein the display presents a user interface.

11. The device of claim 10, wherein at least one characteristic of the user interface presented on the display is transformed based on the change in the angle between the first portion and the second portion of the device.

12. The device of claim 1, further comprising an angle measurement unit which calculates the angle of fold between the two portions of the device.

13. The device of claim 12, wherein the angle measurement unit is collocated with the magnetic sensor.

14. The device of claim 13, wherein the angle measurement unit is implemented in a processor comprised in the device.

15. A mobile device comprising:
   a first portion;
   a second portion;
   a folding element between the first portion and the second portion;
   a magnetic sensor disposed on the first portion capable of measuring an ambient magnetic field;
   a bendable elongated element having a fixed length, the bendable elongated element configured between the first portion and the second portion, fixed with respect to the second portion, and configured inside a hinge element; and
   a magnetic element configured on a free end of the bendable elongated element so that rotation of the first portion with respect to the second portion causes relative motion between the magnetic element and the magnetic sensor;
   wherein an angle of rotation between the two portions is calculated based on the ambient magnetic field as determined by the magnetic sensor.

16. The device according to claim 15, further comprising a touch sensitive display providing a graphical user interface.

17. The device according to claim 16, wherein at least one characteristic of the graphical user interface is transformed based upon the angle of fold between the portions of the device.

18. A method, comprising:
   measuring a magnetic field due to a magnet,
      wherein the magnet is configured to move longitudinally corresponding to a folding motion of two portions of a foldable device,
      wherein the magnet is configured on a free end of a non-extensible element,
      wherein the non-extensible element is configured inside a hinge element;
   calculating a position of the magnet based on the magnetic field; and
   determining an angle of fold between the two portions of the device, based on the position of the magnet.

* * * * *